US 6,602,358 B1

(12) United States Patent
Ochi et al.

(10) Patent No.: US 6,602,358 B1
(45) Date of Patent: Aug. 5, 2003

(54) OUTER RACE FOR CONSTANT VELOCITY JOINT, HAVING IMPROVED ANTI-FLAKING PROPERTIES AND SHAFT STRENGTH, AND PROCESS FOR PRODUCING THE SAME

(75) Inventors: Tatsuro Ochi, Muroran (JP); Hideo Kanisawa, Muroran (JP); Kenichiro Naito, Muroran (JP); Joji Tamura, Muroran (JP); Masayoshi Saga, Mooka (JP)

(73) Assignees: Nippon Steel Corporation, Tokyo-to (JP); Honda Motor Co., Ltd., Tokyo-to (JP)

( * ) Notice: Subject to any disclaimer, the term of this patent is extended or adjusted under 35 U.S.C. 154(b) by 0 days.

(21) Appl. No.: 09/442,490

(22) Filed: Nov. 18, 1999

(30) Foreign Application Priority Data

Nov. 19, 1998 (JP) .......................................... 10-344853

(51) Int. Cl.⁷ .......................... C22C 38/14; C21D 9/40; F16D 3/20
(52) U.S. Cl. ........................ 148/328; 148/573; 148/586; 148/588
(58) Field of Search ................................. 148/328, 573, 148/586, 588

(56) References Cited

U.S. PATENT DOCUMENTS 3,610,709 A  * 10/1971 Allen
3,673,817 A  *  7/1972 Doran et al.
5,803,993 A     9/1998 Yoshida et al. ............. 148/320
5,853,502 A    12/1998 Aihara et al. ............... 148/319

FOREIGN PATENT DOCUMENTS

JP           2290640        11/1990
JP         10-195589     *  7/1998

* cited by examiner

Primary Examiner—Sikyin Ip
(74) Attorney, Agent, or Firm—Birch, Stewart, Kolasch & Birch, LLP

(57) ABSTRACT

Disclosed are an outer race for a constant velocity joint, having improved anti-flaking properties and shaft strength, and a process for producing the same. The outer race for a constant velocity joint includes a cup and a serration and comprises by weight carbon: 0.45 to 0.59%, silicon: 0.15 to 0.4%, manganese: 0.15 to 0.45%, sulfur: 0.005 to 0.15%, molybdenum: 0.1 to 0.35%, boron: 0.0005 to 0.005%, aluminum: 0.015 to 0.05%, and titanium: 0.015 to 0.03%, the proportion of the effective case depth in track grooves of the cup being 0.25 to 0.45 in terms of the ratio of the effective case depth t to the wall thickness of the cup w, t/w, the proportion of the effective case depth of the involute serration in its end being 0.20 to 0.50 in terms of the ratio of the effective case depth t to the radius r, t/r. The involute serration in its end preferably has a former austenite grain size of not less than 8 in terms of the grain size number specified in JIS (Japanese Industrial Standards).

4 Claims, 4 Drawing Sheets

OUTER RACE FOR CONSTANT VELOCITY JOINT, HAVING IMPROVED ANTI-FLAKING PROPERTIES AND SHAFT STRENGTH, AND PROCESS FOR PRODUCING THE SAME

TECHNICAL FIELD

The present invention relates to an outer race for a constant velocity joint, having improved anti-flaking properties and shaft strength, and a process for producing the same.

BACKGROUND OF THE INVENTION

Regarding outer races for constant velocity joints, one of drive components of automobiles, in order to cope with an increase in power of automobile engines or atmospheric control in recent years, there is an ever-increasing trend toward an increase in strength of outer races. Strength properties required of outer races for constant velocity joints are anti-flaking properties and shaft strength. For the outer races, track grooves in a cup, which come into contact with balls, should have anti-flaking properties. The strength properties required of the shaft are torsional strength and torsional fatigue strength.

Japanese Patent Laid-Open Publication No. 280262/1997 discloses a high strength outer race for a constant velocity joint, and a process for producing the same. According to the technique disclosed in this laid-open publication, a steel comprising carbon: 0.45 to 0.53%, silicon: 0.05 to 0.25%, manganese: 0.7 to 1.0%, aluminum: 0.01 to 0.05%, molybdenum: 0.2 to 0.4%, and nitrogen: 0.003 to 0.012%, and, in addition, chromium: limited to not more than 0.05%, phosphorus: limited to not more than 0.015%, sulfur: limited to not more than 0.01%, and oxygen: limited to not more than 0.002% is first forged in the temperature range of 850 to 950° C. to form a section having a regulated fine grain structure. The section is then cold forged, machined, and form rolled into a predetermined shape including an involute serration and the like, followed by induction hardening and tempering of the involute serration. Thus, a high strength outer race for a constant velocity joint is obtained wherein the involute serration in its end has a former austenite grain size of not less than 8 in terms of the grain size number specified in JIS (Japanese Industrial Standards), the surface hardness HV is not less than 720, and the ratio of the effective case depth to the radius of the shaft is 0.35 to 0.60.

The above publication refers to the improvement in torsional strength and torsional fatigue strength of the shaft. The anti-flaking properties (described as the rolling life in the above publication), however, are equal to those attained in the prior art. Further, forming is mainly carried out by hot forging. This is likely to cause significant distortion in the track grooves, to cause partial contact of balls, and to cause a deterioration in anti-flaking strength.

The technique disclosed in the above publication cannot provide excellent anti-flaking properties as the outer race for a constant velocity joint without difficulty. Accordingly, it is an object of the present invention to solve the above problems of the prior art and to provide an outer race for a constant velocity joint, which is excellent in both anti-flaking properties and shaft strength, and a process for producing the same.

DISCLOSURE OF THE INVENTION

The above object can be attained by the following invention. Specifically, according to one aspect of the present invention, there is provided an outer race for a constant velocity joint, including a cup and an involute serration and having improved anti-flaking properties and shaft strength, said outer race comprising as a steel material by weight carbon: 0.45 to 0.59%, silicon: 0.15 to 0.4%, manganese: 0.15 to 0.45%, sulfur: 0.005 to 0.15%, molybdenum: 0.1 to 0.35%, boron: 0.0005 to 0.005%, aluminum: 0.015 to 0.05%, and titanium: 0.015 to 0.03% and, in addition, nitrogen: limited to not more than 0.005% (inclusive of 0%), chromium: limited to not more than 0.1% (inclusive of 0%), phosphorus: limited to not more than 0.02% (inclusive of 0%), and oxygen: limited to not more than 0.002% (inclusive of 0%), with the balance consisting of iron and unavoidable impurities, the proportion of the effective case depth in track grooves of the cup being 0.25 to 0.45 in terms of the ratio of the effective case depth t to the wall thickness of the cup w, t/w, the proportion of the effective case depth of the involute serration in its end being 0.20 to 0.50 in terms of the ratio of the effective case depth t to the radius r, t/r. Preferably, the involute serration in its end has a former austenite grain size of not less than 8 in terms of the grain size number specified in JIS (Japanese Industrial Standards).

According to another aspect of the present invention, there is provided a process for producing an outer race for a constant velocity joint, including a cup and an involute serration and having improved anti-flaking properties and shaft strength, said process comprising the steps of: subjecting a steel comprising the above constituents to annealing, cold forging, machining, and form rolling to form an outer race having a predetermined shape; and then induction hardening the outer race in its shaft including the inner surface of the cup and the involute serration, followed by tempering, thereby producing such an outer race for a constant velocity joint that the proportion of the effective case depth in track grooves of the cup is 0.25 to 0.45 in terms of the ratio of the effective case depth t to the wall thickness of the cup w, t/w, and the proportion of the effective case depth of the involute serration in its end is 0.20 to 0.50 in terms of the ratio of the effective case depth t to the radius r, t/r. Preferably, the former austenite grain size of the involute serration in its end is brought to not less than 8 in terms of the grain size number specified in JIS.

Use of the outer race for a constant velocity joint and the process for producing the same according to the present invention can provide constant velocity joint products possessing improved anti-flaking properties and shaft strength.

BEST MODE FOR CARRYING OUT THE INVENTION

Figure 1A:
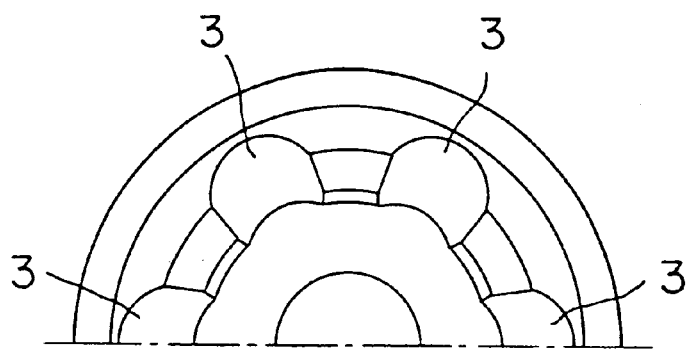
FIG. 1A is a diagram showing the front shape of an outer race of a constant velocity joint used in a flaking life test and a torsional strength test.

In order to realize an outer race for a constant velocity joint, having improved anti-flaking properties and shaft strength, and a process for producing the same, the present inventors have made extensive and intensive studies and, as a result, have obtained the following finding.

(1) In outer races, flaking fracture of a mouse in its track grooves occurs through the following mechanism. Coarse TiN or oxide serves as the origin of the flaking fracture. A change in structure is created in the course of the rolling fatigue, and fracture occurs through a portion having lowered hardness as a propagation path. Therefore, the following points are important for increasing the anti-flaking strength.

(a) The hardness is increased by increasing the carbon content.

(b) Molybdenum and silicon are added to inhibit a change in structure and a deterioration in quality in the course of the rolling fatigue.

(c) The nitrogen content and the titanium content are reduced to prevent the production of coarse TiN.

(2) Large distortion of track grooves causes partial contact of balls and consequently lowers the anti-flaking strength. In order to reduce the distortion of the track grooves, the section of the outer race is produced from a steel bar in the step of cold forging, and, in addition, the case depth hardened by induction hardening in the track grooves of the mouse is specified to reduce the induction hardening strain.

(3) In the shaft, both torsional fracture and torsional fatigue fracture occur in notches provided at the end of the involute serration. The larger the case depth, the higher the fatigue strength of the shaft. However, excessively large case depth has a fear of quenching cracks being induced. Therefore, the upper limit of the case depth should be specified. Intergranular strength also greatly affects the torsional fatigue strength. Increasing the carbon content for improving the anti-flaking strength usually results in lowered intergranular strength and lowered fatigue strength of the shaft. In order to cope with this, the intergranular strength is increased by the addition of boron, the addition of molybdenum, the addition of silicon, and a reduction in phosphorus content. Further, cold forging is followed by induction hardening. This refines former austenite grains and further improves the intergranular strength. Thus, according to the present invention, even when the carbon content is increased, the fatigue strength of the shaft can be increased.

(4) In view of the above demands, in order to render the steel cold forgeable while ensuring induction hardenability, boron is added to the steel. Boron can increase the hardenability and, as described above, further has the effect of strengthening grain boundaries. In the case of steels with boron added thereto, the addition of titanium is indispensable. This generally leads to a deterioration in anti-flaking strength due to the formation of coarse TiN. According to the present invention, however, as described above, the formation of coarse TiN is prevented by reducing the nitrogen content and the titanium content. This has increased the anti-flaking strength for the first time in boron treated steels.

The present invention has been made based on such novel finding.

The present invention will be described in more detail.

Carbon is an element which is effective in imparting necessary strength to the steel. When the content of carbon is less than 0.45%, necessary strength cannot be ensured. On the other hand, when the carbon content exceeds 0.59%, the steel is excessively hard, leading to deteriorated cold workability. Therefore, the carbon content should be 0.45 to 0.59%.

Silicon is an element which is effective in the deoxidation of the steel and, at the same time, is effective in imparting necessary strength and hardenability to the steel and improving the temper softening resistance. When the content of silicon is less than 0.15%, the contemplated effect is unsatisfactory. On the other hand, a silicon content exceeding 0.4% leads to an increase in hardness and consequently deteriorates cold workability. For the above reason, the silicon content should be 0.15 to 0.4%.

Manganese is an element which is effective in improving the induction hardenability. When the content of manganese is less than 0.15%, satisfactory hardenability cannot be ensured. On the other hand, a manganese content exceeding 0.45% leads to a significant increase in hardness and consequently deteriorates cold workability. Therefore, the manganese content should be 0.15 to 0.45%.

Sulfur is added to form, in the steel, MnS which functions to improve the machinability. When the content of sulfur is less than 0.005%, the contemplated effect is unsatisfactory. On the other hand, when the sulfur content exceeds 0.15%, the effect is saturated. Further, in this case, intergranular segregation occurs, leading to intergranular embrittlement. For the above reason, the sulfur content should be 0.005 to 0.15%. The sulfur content is preferably 0.005 to 0.04%.

Molybdenum is an element which functions to impart strength and hardenability to the steel and, at the same time, is effective in improving the intergranular strength after induction hardening to increase the strength properties. When the content of molybdenum is less than 0.1%, the contemplated effect is unsatisfactory. On the other hand, a molybdenum content exceeding 0.35% leads to increased hardness and consequently deteriorates cold workability. For the above reason, the molybdenum content should be 0.1 to 0.35%.

Boron is added for attaining the following three effects. (a) In steel bar and wire rod rolling, boron iron carbide is produced in the course of cooling after rolling. This increases the growth rate of ferrite and accelerates softening of the as-rolled steel. (b) In the induction hardening, hardenability is imparted to the steel. (c) The intergranular strength of the induction hardening material is improved to improve fatigue strength and impact strength as mechanical components. When the content of boron is less than 0.0005%, the contemplated effect is unsatisfactory, while when the boron content exceeds 0.005%, the effect is saturated. For this reason, the boron content should be 0.0005 to 0.005%.

Aluminum is added as a deoxidizer. When the content of aluminum is less than 0.015%, the contemplated effect is unsatisfactory. On the other hand, when the aluminum content exceeds 0.05%, the effect is saturated. Further, in this case, the hardness is increased, resulting in deteriorated cold workability. For the above reason, the aluminum content should be 0.015 to 0.05%.

Titanium combines with nitrogen in the steel to form TiN. Titanium is added for forming TiN to fix nitrogen in solid solution, thereby preventing the precipitation of BN, that is, for ensuring boron in solid solution. However, when the content of titanium is less than 0.015%, the contemplated effect is unsatisfactory. On the other hand, when the titanium content exceeds 0.03%, precipitation hardening by TiC is significant, leading to significantly deteriorated cold workability. For the above reason, the titanium content should be 0.015 to 0.03%.

Preferably, the content of nitrogen is minimized for the following two reasons. (a) As described above, boron is added for improving the hardenability, strengthening grain boundaries and other purposes. These effects of boron cannot be attained without the presence of boron in solid solution within the steel. Therefore, the amount of nitrogen should be reduced to suppress the production of BN. (b) Nitrogen, when combined with titanium in the steel, produces coarse TiN which increases the hardness and, in addition, is causative of cold forging cracking, resulting in significantly deteriorated cold workability. The above adverse effect is particularly significant when the nitrogen content exceeds 0.005%. For the above reason, the nitrogen content should be not more than 0.005%.

Chromium is dissolved as a solid solution in cementite to stabilize the cementite. Therefore, dissolution of cementite upon heating for a short period of time at the time of induction hardening is likely to be unsatisfactory. This is causative of uneven hardness. This behavior is particularly significant when the chromium content exceeds 0.1%. For the above reason, the chromium content should be limited to not more than 0.1%.

Phosphorus is an element which enhances the deformation resistance at the time of the cold forging and deteriorates the toughness. Therefore, phosphorus deteriorates the cold workability. Further, phosphorus embrittles grain boundaries of components after induction hardening and tempering, and consequently deteriorates the fatigue strength of final products. Therefore, preferably, the phosphorus content is minimized. For this reason, the phosphorus content should be limited to not more than 0.02%.

Oxygen forms oxide inclusions, such as $Al_2O_3$, in the steel. When oxide inclusions are present in a large amount in the steel, the cold workability is deteriorated. Further, in this case, the anti-flaking properties after induction hardening are also deteriorated. This tendency is particularly significant when the oxygen content exceeds 0.002%. Therefore, the oxygen content should be limited to not more than 0.002%.

According to the present invention, the outer race for a constant velocity joint, including a cup and an involute serration comprises the above steel as a material. The proportion of the effective case depth in track grooves of the cup is 0.25 to 0.45 in terms of the ratio of the effective case depth t to the wall thickness of the cup w, t/w, and the proportion of the effective case depth of the involute serration in its end is 0.20 to 0.50 in terms of the ratio of the effective case depth t to the radius r, t/r. The effective case depth referred to herein is the effective case depth as measured by the method of measuring the case depth hardened by induction hardening, as specified in JIS G 0559. The reasons for the limitation of the effective case depth according to the present invention will be described.

Anti-flaking strength is required of track grooves in the cup because balls come into contact with the track grooves. To this end, induction hardening is carried out. In this case, when the proportion of the effective case depth in track grooves of the cup is less than 0.25 in terms of the ratio of the effective case depth t to the wall thickness of the cup w, t/w, the contemplated effect is unsatisfactory.

On the other hand, when the effective case depth is excessively large, the strain of the track grooves is increased. This causes partial contact of the balls, unfavorably results in deteriorated anti-flaking strength. This tendency is particularly significant when the proportion of the effective case depth, t/w, exceeds 0.45.

For the above reason, the proportion of the effective case depth in the track grooves of the cup is limited to 0.25 to 0.45 in terms of the ratio of the effective case depth t to the wall thickness of the cup w, t/w.

The torsional fatigue failure in the shaft occurs in notches provided at the end of the involute serration. The higher the proportion of the effective case depth in the involute serration in its end, the better the torsional fatigue strength of the shaft. When the proportion of the effective case depth is less than 0.20 in terms of the ratio of the effective case depth t to the radius r, t/r, the contemplated effect is unsatisfactory.

On the other hand, when the proportion of the effective case depth in terms of t/r exceeds 0.50, the effect is saturated. Further, in this case, the compression residual stress of the surface is reduced, leading to a fear of quenching cracks being created.

For the above reason, the proportion of the effective case depth of the involute serration in its end is limited to 0.20 to 0.50 in terms of the ratio of the effective case depth t to the radius r, t/r.

According to a preferred embodiment of the present invention, in order to further improve the strength properties of the shaft, the former austenite grain size of the involute serration in its end is brought to not less than 8 in terms of the grain size number specified in JIS or equivalent ASTM standard. The reason why the grain size in the above range can further improve the strength properties of the shaft is as follows. The torsional strength and torsional fatigue hardness of the shaft are influenced by the intergranular strength of the former austenite.

The finer the grains, the smaller the amount of impurities segregated within grain boundaries and the better the intergranular strength. This effect is particularly significant when the former austenite grain size is not less than 8 in terms of the grain size number specified in JIS. Therefore, the former austenite grain size of the involute serration in its end is brought to not less than 8 in terms of the grain size number specified in JIS.

One of the features of the process for producing an outer race for a constant velocity joint, having improved anti-flaking properties and shaft strength, according to the present invention is that the outer race is produced by cold forging alone without the step of hot forging. By virtue of this feature, cold forging followed by induction hardening can refine former austenite grains and can improve the intergranular strength. Further, forming by cold forging is advantageous in that the strain after forging is small leading to lowered strain in the track grooves of the mouse in the final product. This can prevent a deterioration in anti-flaking strength caused by partial contact of balls in the track grooves.

The cold forging may be carried out in a plurality of steps. If necessary, softening may be carried out between the cold forging steps.

EXAMPLES

The chemical compositions of steels according to the present invention and comparative steels used in the following examples and comparative examples are summarized in Table 1. Steel Nos. 1 to 3 of the invention respectively have the same chemical compositions as steels corresponding to S53C, S55C, and S58C, except that the content of manganese and the content of phosphorus have been lowered, molybdenum and boron have been added, the content of nitrogen has been lowered, and the amount of titanium added has been minimized. On the other hand, comparative steel Nos. 4 and 5 are carbon-boron steels which respectively have the same chemical compositions as steels corresponding to S48C and S53C, except that the content of silicon and the content of manganese have been lowered and boron has been added.

Furthermore, the formation of a significant amount of coarse TiN due to higher titanium and nitrogen contents than the titanium and nitrogen content ranges specified in the present invention is also causative of the deteriorated flaking life.

TABLE 1

| Classi-fication | No. | Constituents of material under test, wt % | | | | | | | | | | |
|---|---|---|---|---|---|---|---|---|---|---|---|---|
| | | C | Si | Mn | S | Mo | B | Al | Ti | N | Cr | P | O |
| Steel | 1 | 0.57 | 0.20 | 0.20 | 0.014 | 0.18 | 0.0015 | 0.028 | 0.016 | 0.0035 | 0.05 | 0.008 | 0.0011 |
| of | 2 | 0.56 | 0.24 | 0.26 | 0.010 | 0.20 | 0.0023 | 0.030 | 0.020 | 0.0042 | 0.03 | 0.006 | 0.0009 |
| inv. | 3 | 0.58 | 0.30 | 0.30 | 0.014 | 0.23 | 0.0018 | 0.026 | 0.016 | 0.0039 | 0.05 | 0.008 | 0.0012 |
| Comp. | 4 | 0.48 | 0.09 | 0.33 | 0.011 | 0.01 | 0.0018 | 0.026 | 0.042 | 0.0082 | 0.15 | 0.018 | 0.0010 |
| steel | 5 | 0.53 | 0.08 | 0.27 | 0.009 | 0.01 | 0.0016 | 0.027 | 0.039 | 0.0080 | 0.13 | 0.013 | 0.0008 |

Figure 1B:
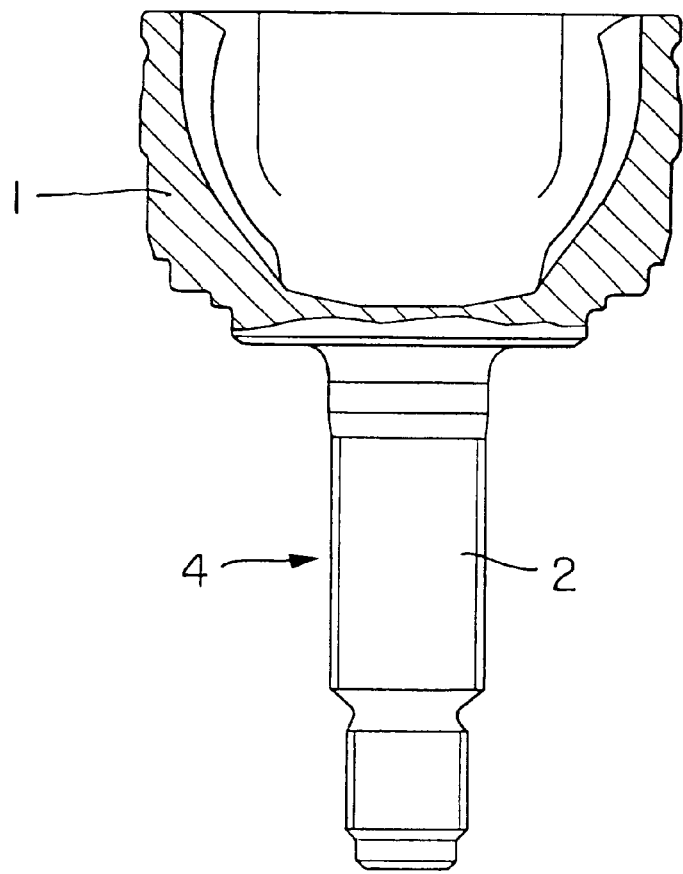
FIG. 1B is the cross sectional diagram of the outer race of a constant velocity joint used in a flaking life test and a torsional strength test.

150 kg of each of the test steels having the chemical compositions specified in Table 1 was produced by the melt process in a vacuum melting furnace. These steels were hot forged into square bars having a size of 162 mm square, and then hot rolled into steel bars having a diameter of 52 mm, followed by spheroidizing. The steel products thus obtained were cold forged, turned, and form rolled to produce outer races for constant velocity joints shown in FIG. 1. For the steels of the present invention, the turnability and the form rollability were the same as those of the comparative steels. The rolling face of the mouse and the shaft in these outer races for constant velocity joints were induction hardened and tempered so that the proportion of the effective case depth in the rolling face, t/w, is 0.35 to 0.43 and the proportion of the effective case depth of the shaft, t/r, is 0.35 to 0.44.

Figure 2:
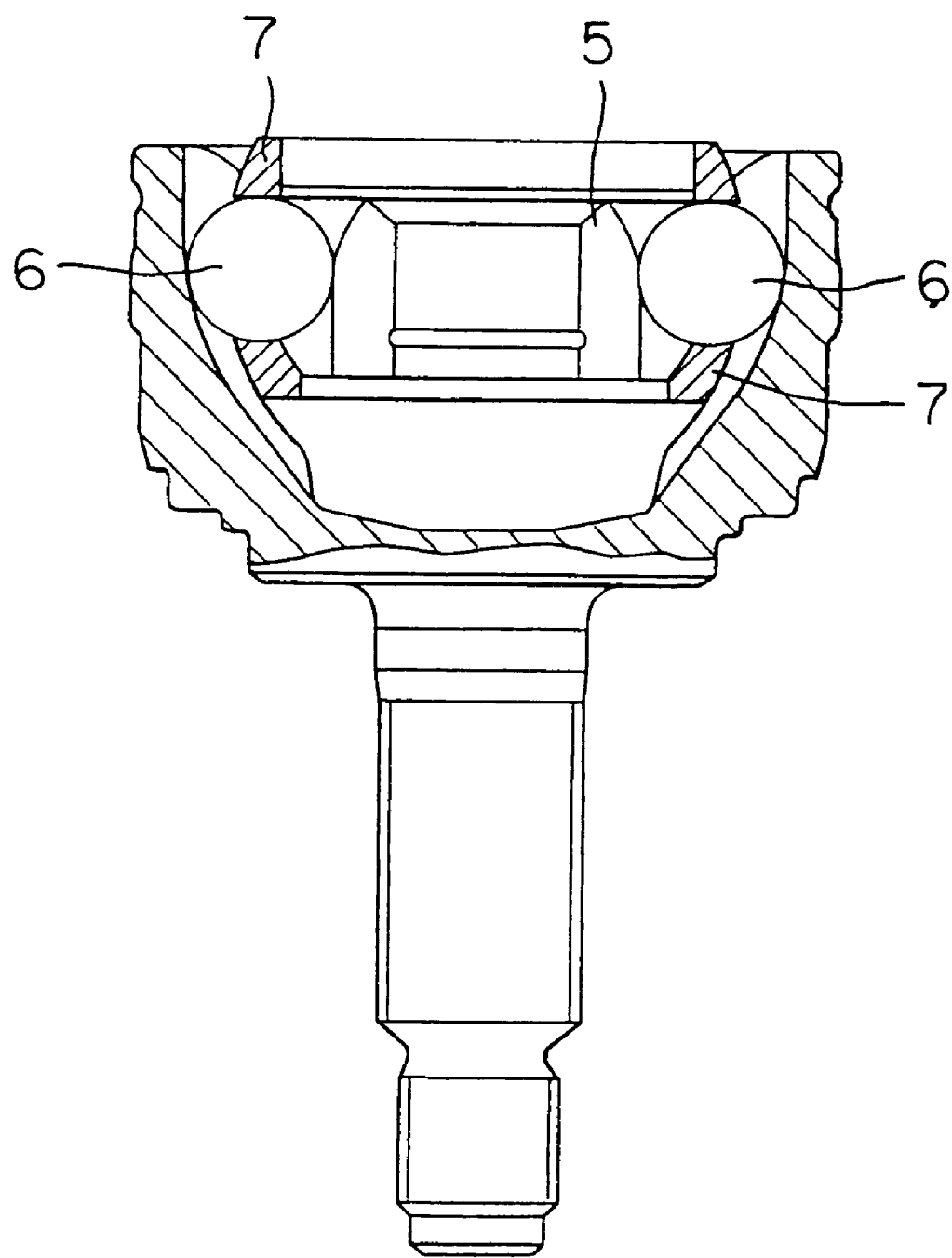
FIG. 2 is a diagram showing a constant velocity joint assembly of inner and outer races and balls used in a flaking life test.

Assembling into a component as shown in FIG. 2 was carried out, and the component was examined for flaking life by means of a power circulation type tester. The service life was evaluated in terms of the bearing pressure necessary for causing flaking in ball grooves in continuous 100-hr operation. For the shaft, the outer race and the serration were fixed, and the breaking strength was measured with a torsional tester.

Figure 3:
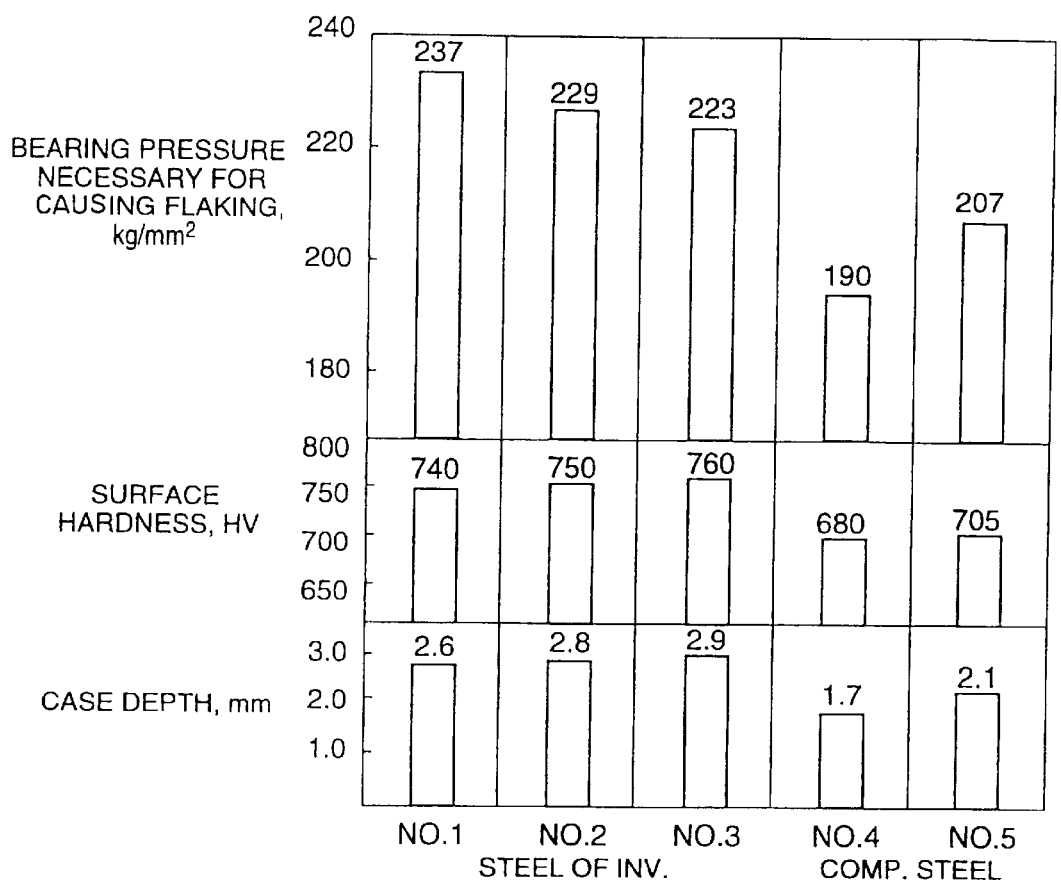
FIG. 3 is a diagram showing the results of a flaking life test.

The results of the flaking life test are shown in FIG. 3. For steel Nos. 1 to 3 of the invention, the bearing pressure necessary for causing flaking were higher than that for comparative steel Nos. 4 and 5, demonstrating that the steels of the present invention had excellent flaking life. Comparative steel Nos. 4 and 5 had lower surface hardness because the chromium content exceeded the upper limit of the chromium content range specified in the present invention. Further, since the silicon and molybdenum contents were lower than the silicon and molybdenum content ranges specified in the present invention, progress of surface softening of the material due to heat of friction created under high load in the course of the rolling fatigue was observed.

Figure 4:
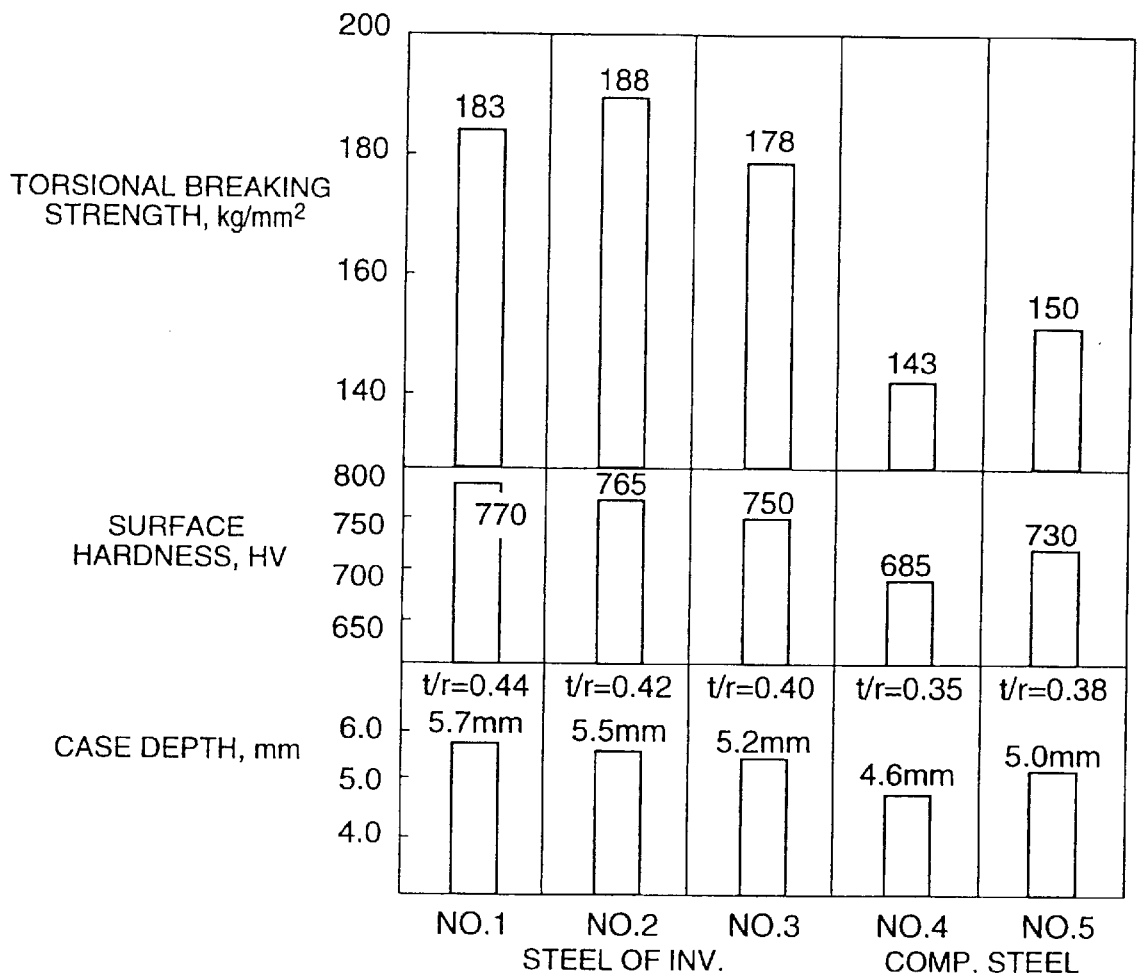
FIG. 4 is a diagram showing the results of a torsional strength test.

The results of the torsional strength test, together with the hardness of the involute serration in its end, are shown in FIG. 4. As is apparent from FIG. 4, the steel Nos. 1 to 3 of the invention had better torsional strength than comparative steel Nos. 4 and 5. The former austenite grain size in terms of the grain size number of the involute serration in its end was 8.2 for steel No. 1, 8.9 for steel No. 2, and 7.6 for steel NO. 3. For the steels of the present invention, the finer the grains, the better the torsional strength. Low torsional strength of comparative steel Nos. 4 and 5 is attributable to the fact that the surface hardness was low due to higher chromium content than the chromium content range specified in the present invention and the intergranular strength was low due to lower silicon and molybdenum contents than the silicon and molybdenum content ranges specified in the present invention.

Next, for steel No. 2, outer races for constant velocity joints were produced in the same manner as described above. In this case, for these outer races for constant velocity joints, the proportion of the effective case depth in the rolling face in the mouse and the proportion of the effective case depth in the shaft (the end of the involute serration) were varied as indicated in Table 2. Further, for these outer races, the bearing pressure necessary for causing flaking and the torsional strength were measured. The results are also shown in Table 2.

TABLE 2

| Classi-fication | No. | Effective case depth of rolling face in mouse, t/w | Effective case depth of shaft, t/r | Bearing pressure necessary for causing flaking, kg/mm$^2$ | Torsional strength, kg/mm$^2$ |
|---|---|---|---|---|---|
| Ex. | 1 | 0.28 | 0.32 | 221 | 179 |
| of | 2 | 0.38 | 0.38 | 227 | 184 |
| inv. | 3 | 0.43 | 0.45 | 236 | 190 |
| Comp. | 4 | 0.14 | 0.40 | 196 | 187 |
| Ex. | 5 | 0.52 | 0.39 | 208 | 185 |
| | 6 | 0.41 | 0.16 | 234 | 160 |
| | 7 | 0.40 | 0.59 | 232 | 168 |

The outer races for constant velocity joints according to the examples of the present invention had excellent anti-flaking strength and torsional strength. By contrast, the outer races for constant velocity joints according to Comparative Examples 4 and 5 had inferior anti-flaking strength due to smaller effective case depth of the rolling face of the mouse than the effective case depth range specified in the present invention (Comparative Example 4) or larger effective case depth than the effective case depth range specified in the present invention (Comparative Example 5). The outer races for constant velocity joints according to Comparative Examples 6 and 7 had inferior torsional strength due to smaller effective case depth of the shaft than the effective case depth range specified in the present invention (Comparative Example 6) or larger effective case depth than the effective case depth range specified in the present invention (Comparative Example 7).

The outer race for a constant velocity joint and the process for producing the same according to the present invention can provide excellent anti-flaking properties as an outer race for a constant velocity joint. Further, good turnability and form rollability are also provided. Thus, the effect of the present invention is very significant from an industrial viewpoint.

What is claimed is:

1. An outer race for a constant velocity joint, including a cup and an involute serration and having improved anti-flaking properties and shaft strength, said outer race comprising a steel material by weight carbon: 0.45 to 0.59%,
silicon: 0.2 to 0.4%,
manganese: 0.15 to 0.45%,
sulfur: 0.005 to 0.15%,
molybdenum: 0.1 to 0.35%
boron: 0.0005 to 0.005%
aluminum: 0.015 to 0.05%; and
titanium: 0.015 to 0.03% and, in addition,
nitrogen: limited to not more than 0.005% (inclusive of 0%),
chromium: limited to not more than 0.10% (inclusive of 0%),
phosphorus: limited to not more than 0.020% (inclusive of 0%), and
oxygen: limited to not more than 0.0020% (inclusive of 0%),
with the balance consisting of iron and unavoidable impurities, the proportion of an effective case depth in track grooves of the cup being 0.25 to 0.45 in terms of the ratio of the effective case depth t to the wall thickness of the cup w, t/w, the proportion of the effective case depth of the involute serration in its end being 0.20 to 0.50 in terms of the ratio of the effective case depth t to the radius r, t/r.

2. The outer race for a constant velocity joint according to claim 1, wherein the involute serration in its end has a former austenite grain size of not less than 8 in terms of the grain size number specified in ASTM standard.

3. A process for producing an outer race for a constant velocity joint, including a cup and an involute serration and having improved anti-flaking properties and shaft strength, said process comprising the steps of: subjecting a steel comprising by weight carbon: 0.45 to 0.59%,
silicon: 0.15 to 0.4%,
manganese: 0.15 to 0.45%,
sulfur: 0.005 to 0.15%,
molybdenum: 0.1 to 0.35%,
boron: 0.0005 to 0.005%,
aluminum: 0.015 to 0.05%, and
titanium: 0.015 to 0.03% and, in addition,
nitrogen: limited to not more than 0.005% (inclusive of 0%),
chromium: limited to not more than 0.1% (inclusive of 0%),
phosphorus: limited to not more than 0.02% (inclusive of 0%), and
oxygen: limited to not more than 0.002% (inclusive of 0%),
with the balance consisting of iron and unavoidable impurities,
to annealing, cold forging, machining, and form rolling to form an outer race having a predetermined shape; and
then induction hardening the outer race in its shaft including the inner surface of the cup and the involute serration, followed by tempering, thereby producing an outer race for a constant velocity joint that the proportion of the effective case depth in track grooves of the cup is 0.25 to 0.45 in terms of the ratio of the effective case depth t to the wall thickness of the cup w, t/w, and the proportion of the effective case depth of the involute serration in its end is 0.20 to 0.50 in terms of the ratio of the effective case depth t to the radius r, t/r.

4. The process according to claim 3, wherein the former austenite grain size of the involute serration in its end is brought to not less than 8 in terms of the grain size number specified in ASTM standard.

* * * * *